July 19, 1949.  E. E. LANDAHL  2,476,497

DRIVE FOR OVERHEAD CONVEYERS

Filed April 7, 1945

Inventor
Eugene E. Landahl.

By W. A. McDowell
Attorney

Patented July 19, 1949

2,476,497

UNITED STATES PATENT OFFICE 2,476,497

DRIVE FOR OVERHEAD CONVEYERS

Eugene E. Landahl, Detroit, Mich.

Application April 7, 1945, Serial No. 587,096

6 Claims. (Cl. 198—203)

This invention relates to conveyors and, more particularly, to conveyors of the so-called overhead type, such as those used in factories, and other commercial establishments, for transferring goods in various stages of manufacture from one department or location to another.

Such conveyors typically involve rollered load-carrying heads or trolleys adapted for operation along stationary guide rails or tracks supported from the roof or ceiling of a factory or other elevated support, the heads or trolleys being flexibly united and arranged at longitudinally spaced intervals so that the same may travel as a flexible system around curved trackways as well as straight ones.

It has been a matter of some appreciable difficulty to provide simple, reliable and efficient means for effecting a smooth and uniform application of power to such a conveyor. Ordinary power driven sprocket wheels do not properly mate with the spaced trolley heads and can not be used. Other drives, having limited surface engagement with the trolleys, have proved ineffective and a source of considerable mechanical disorder, as a result of high unit strains and stresses and resulting mechanical failure of their parts.

Accordingly, it is an object of the present invention to provide a drive mechanism for the trolley-type overhead conveyor wherein an endless motor-driven chain or belt is provided carrying spaced trolley-gripping brackets, which during movement of the chain or belt, register with and grip a plurality of adjacent trolleys, whereby to cause movement of the whole trolley system along its supporting tracks in exact uniformity with the linear speed of the chain or belt and with an absence of undue mechanical stresses or strains therein.

For a further understanding of the invention, reference is to be had to the following description and the accompanying drawings, wherein.

Figure 1:
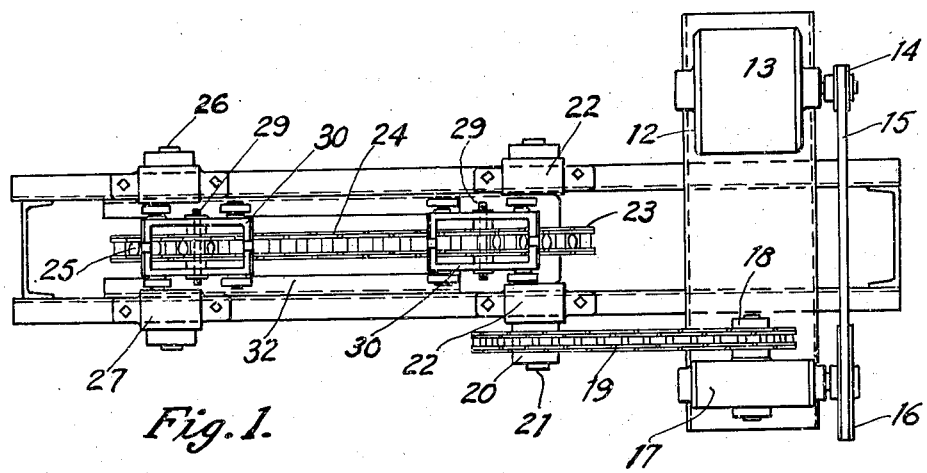
Fig. 1 is a top plan view of a conveyor-driving mechanism formed in accordance with the present invention.
Figure 2:
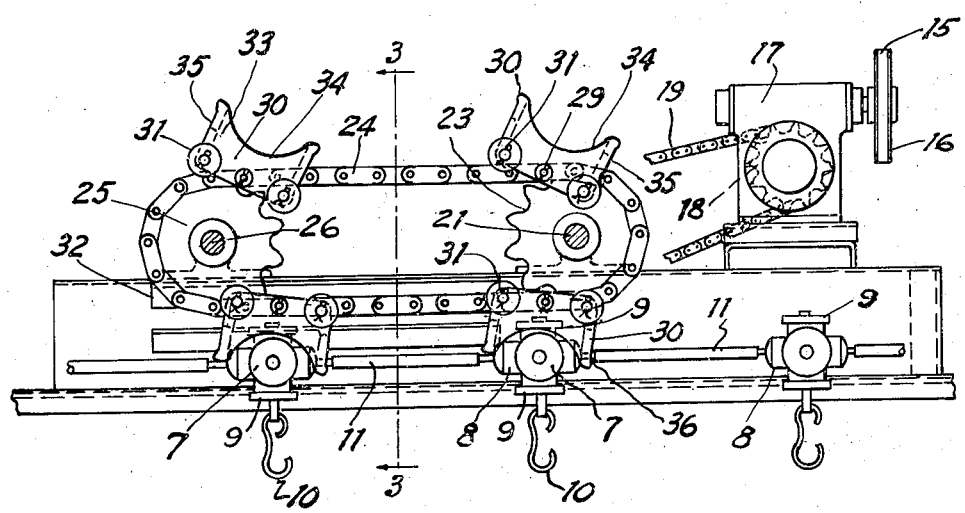
Fig. 2 is a view partly in vertical section and partly in side elevation of the drive mechanism and the associated trolley system.
Figure 3:
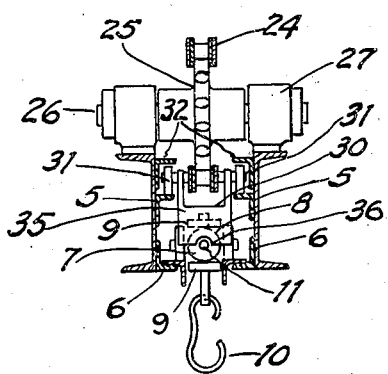
Fig. 3 is a transverse vertical sectional view on the line 3—3 of Fig. 2.

Referring more particularly to the drawings, the numeral 5 designates a pair of spaced channel rails adapted to be stationarily supported in any suitable manner in an overhead or elevated position. The rails have welded or otherwise rigidly secured thereto a set of lower angle irons 6, the horizontal flanges of which receive vertically disposed rollers 7 provided on the conveyor heads or trolleys 8. The latter may be of the construction disclosed in my prior Patent No. 2,249,531 granted July 15, 1941. The trolleys also carry upper and lower horizontally disposed rollers 9 adapted for engagement with the vertical flanges of the angle iron 6. Below the channel rails, the trolleys carry depending hooks 10 on which products to be transported by the conveyor are held in a suspended manner. The trolley units are spaced and flexibly united by means of intervening rods 11, having at their ends ball and socket or other universal connection with the bodies of said trolleys, allowing the latter to negotiate, after the manner of an endless conveyor, both straight and curved supporting trackways.

To drive such a conveyor, the present invention provides the channel rails 5 with a transversely extending motor base 12 on which is positioned an electric motor 13. The armature shaft of this motor drives a belt wheel 14, around which passes an endless belt 15, the latter being also trained over a second belt wheel 16 formed with the driving shaft of a speed-reducing gearing, indicated generally by the numeral 17. The driven shaft of this gearing carries a sprocket 18, over which is trained an endless chain 19, the latter being also trained over a second sprocket 20 which is fixed to a cross shaft 21 journaled in bearings 22 supported on the upper surfaces of the rails 5. Between the bearings 22, the shaft 21 is provided with a drive sprocket 23 for the reception of an endless drive chain 24, the latter also passing around a second sprocket 25 carried by a shaft 26, which is journaled in bearings 27 mounted on the rails 5. The drive chain is thus located in a vertical plane passing centrally between the channel rails 5.

Pivotally mounted as at 29 on the chain 24 are a plurality of conveyor engaging and moving brackets 30. Each of these brackets comprises a hollow casting of cubical configuration supporting at four corners thereof track-engaging rollers 31 which, upon movement of the drive chain 24, are adapted for engagement, along the lower run of the drive chain, with guide rails 32 carried by the inner surfaces of the channel rails 5. The side walls 33 of the brackets 30 are arcuately recessed as at 34 in order to clear the vertical rollers 7 of the trolleys 8, while the end walls 35 of said brackets are recessed as at 36 to receive the uniting rods 11 of said trolleys.

Consideration will disclose that the brackets moving with the lower run of the drive chain 24 are so spaced that the same will receive within the confines thereof a pair of the trolley units 8 partly enclosing the latter and confining the same between the end walls of said brackets, whereby to advance the conveyor along its trackway at a linear speed exactly corresponding to that of the endless carrier or drive chain 24, and specifically preventing the conveyor from moving at a speed greater than that of the linear advance of the drive chain.

The present invention thus provides a simple, compact and efficient drive mechanism for overhead conveyors of the multiple trolley unit-type in which the linear speed or rate of travel of the conveyor on its associated trackway may be precisely and accurately controlled, so that the product supported by the conveyor may be moved from one manufacturing department to another in an orderly manner and at such a rate of advance as will best conform to manufacturing or material-handling operations required. The drive mechanism occupies an out-of-the-way position and its over all efficiency is such that a relatively low power electric motor, with the associated speed-reducing mechanism, may be used as a prime mover for an extensive overhead conveyor system.

While I have described and illustrated a single preferred embodiment of my invention, nevertheless, the specific construction is subject to certain variation and modification without departing necessarily from the spirit of the invention or the scope of the following claims.

I claim:

1. Overhead conveyor mechanism comprising stationary track rails, a plurality of trolley units movable along said rails, each of said trolleys including a body, connecting and spacing rods flexibly joined at their ends with the bodies of said units, an endless drive chain supported by said rails above said trolley units for movement in a vertical plane, drive means mounted on said rails for operating said chain, a plurality of brackets pivotally carried by said chain at spaced intervals thereon, said intervals corresponding to the spacing of said trolley units, the brackets moving in unison with the lower run of said chain, said brackets having spaced end walls adapted for engagement with the bodies of said trolley units both forwardly and rearwardly thereof to produce movement of said trolley units in conformity with that of the drive chain.

2. Overhead conveyor mechanism comprising stationary track rails, a plurality of trolley units movable along said rails, each of said trolleys including a body, connecting and spacing rods flexibly joined at their ends with the bodies of said units, an endless drive chain supported by said rails above said trolley units for movement in a vertical plane, drive means mounted on said rails for operating said chain, a plurality of brackets pivotally carried by said chain at spaced intervals thereon, said intervals corresponding to the spacing of said trolley units, the brackets moving in unison with the lower run of said chain and having spaced end walls disposed for engagement with the bodies of said trolley units both forwardly and rearwardly thereof to produce movement of said trolley units in conformity with that of the drive chain, and rollers carried by said brackets disposed for engagement with guides carried by said track rails when said brackets are in engagement with the trolley units of said conveyor.

3. Conveyor mechanism comprising a pair of spaced stationary track rails, a plurality of rollered trolley units disposed for linear movement on said rails, flexible means uniting said units at uniformly spaced longitudinal intervals, a power driven endless drive member supported for movement in a confined course of travel adjacent to the space formed between said rails, and a plurality of brackets having spaced end walls carried by said drive member at longitudinally spaced intervals thereon, the spacing and end wall formation of said brackets being such as to cause the same to register with and receive the front and rear ends of each of said trolley units as the drive member is operated, whereby to cause said units to be advanced linearly along said rails at speeds according precisely to those of said drive member and brackets.

4. Conveyor mechanism comprising a pair of spaced stationary track rails, a plurality of rollered trolley units disposed for linear movement on said rails, tie rods uniting said units at substantially uniformly spaced longitudinal intervals, a power driven endless chain supported for movement in a confined course of travel with the lower run thereof disposed immediately over said trolley units, and a plurality of substantially hollow brackets having side and end walls, means pivotally connecting the side walls of said brackets adjacent the ends thereof to said chain at spaced intervals, said intervals corresponding to the spacing of said trolley units, the end walls of said brackets having recessed edges, said recessed edges being engaged with the opposite ends of said trolley units and their connecting tie rods, whereby to cause said units to be advanced linearly along said rails at speeds according precisely to those of said chain and brackets.

5. Conveyor mechanism as defined in claim 4 and wherein the side walls of said brackets carry rollers having engagement with fixed guides provided on said track rails.

6. Conveyor mechanism as defined in claim 4, and wherein the side walls of the brackets are arcuately recessed to receive rollers of the trolley units.

EUGENE E. LANDAHL.

REFERENCES CITED

The following references are of record in the file of this patent:

UNITED STATES PATENTS

| Number | Name | Date |
|---|---|---|
| 802,047 | Krell | Oct. 17, 1905 |
| 1,740,607 | Leary | Dec. 24, 1929 |
| 1,903,488 | Stibbs | Apr. 11, 1933 |
| 2,249,531 | Landahl | July 15, 1941 |
| 2,309,587 | Hassler | Jan. 26, 1943 |